United States Patent [19]
Liu et al.

[11] Patent Number: 5,830,964
[45] Date of Patent: Nov. 3, 1998

[54] VINYL PYRROLIDONE POLYMERS SUBSTANTIALLY FREE OF VINYL LACTAM MONOMERS

[75] Inventors: Kou-chang Liu, Wayne; Lowell R. Anderson, Morristown; Rajiv Ginde, Wayne; Colleen M. Rocafort, Lake Hiawatha, all of N.J.

[73] Assignee: ISP Investments Inc., Wilmington, Del.

[21] Appl. No.: 993,908

[22] Filed: Dec. 18, 1997

[51] Int. Cl.$^6$ .................... C08F 226/06; C08F 226/10; C08F 222/06; C08F 220/56; C08F 220/04; C08F 220/18; C08F 220/21

[52] U.S. Cl. .................... 526/264; 526/271; 526/303.1; 526/318.3; 526/328.5; 526/320; 526/319; 526/332

[58] Field of Search .................... 526/264, 271, 526/303.1, 318.3, 328.5, 319, 320, 332

[56] References Cited

U.S. PATENT DOCUMENTS 4,743,666  5/1988  Engelhardt et al. .................... 526/264

*Primary Examiner*—Bernard Lipman
*Assistant Examiner*—Wu C. Cheng
*Attorney, Agent, or Firm*—Marilyn J. Maue; William J. Davis; Walter Katz

[57] ABSTRACT

This invention relates to substantially colorless and odorless vinyl lactam polymers containing less than 100 ppm residual vinyl pyrrolidone and less than 1000 ppm vinyl caprolactam monomers and to the process for producing said polymers in the above state of purity which comprises contacting a vinyl pyrrolidone and/or vinyl caprolactam polymer containing excessive residual monomer with between about 0.1 and about 9 wt. % of porous resin having a sulfonic and/or carboxylic functionality wherein said resin has a particle size between 5 and 500 mesh.

17 Claims, No Drawings

VINYL PYRROLIDONE POLYMERS SUBSTANTIALLY FREE OF VINYL LACTAM MONOMERS

BACKGROUND OF THE INVENTION

Polymers of vinyl pyrrolidone which have been prepared by solution polymerization in an organic solvent or in water are well known. However, the product solutions of these processes generally contain undesirable amounts of residual monomer and other impurities which impart objectionable color and odor in the product. As little as 500 ppm N-vinyl pyrrolidone monomer produces a faint but unpleasant odor. Since many lactam polymers, because of their film forming and emollient properties, are in demand for personal care and pharmaceutical formulations, it is primarily important to provide such polymers in as pure a state as possible, particularly with regard to absence of color and odor. For example, a low residual monomer concentration is desired for hair spray fixatives, sun screens and pharmaceutical preparations topically applied to the skin. Color forming impurities such as amines which are often present in some lactam copolymers are also objectionable.

The film forming properties of these polymers also make them important components in agricultural formulations such as leaching inhibitors for plant growth regulating, fungicidal, insecticidal and herbicidal sprays.

Accordingly, it is an object of this invention to provide a colorless, odor free vinyl lactam polymer containing less than 100 ppm vinyl pyrrolidone and less than 1,000 ppm of other vinyl lactam monomers.

Another object is to provide an environmentally safe and economical spray, gel or mousse formulation.

Still another object is to supply an economical and commercially feasible process for producing N-vinyl lactam polymers in a pure state.

These and other objects of this invention will become apparent from the following description and disclosure.

THE INVENTION

In accordance with this invention there is provided a N-vinyl lactam polymer which contains less than 100 ppm residual pyrrolidone monomer which polymer is produced by contacting a polymer solution containing an objectionable amount of monomer with an effective decontaminating amount of an insoluble, polymeric absorbent containing a plurality of functional sulfonic and/or carboxylic acid groups in the form of porous particles having a size of from 5 to 500 mesh, preferably 20 to 200 mesh.

The N-vinyl lactam polymers generally containing objectionable amounts of monomer and other color and odor forming impurites, are obtained in solution, although solid lactam polymers can be diluted for treatment of purification herein described. The polymers suitable for the process of this invention have a weight average molecular weight of between about 5,000 and about 500,000, preferably between about 7,000 and about 100,000 and include homopolymers and polymonomeric polymers of N-vinyl pyrrolidone and/or N-vinyl caprolactam optionally ring substituted with a $C_1$ to $C_4$ alkyl group. Copolymers of these lactams, which can have a random, block or alternating structure, can be lightly crosslinked or non-crosslinked. Suitable comonomers for the lactam monomer include a lower alkyl vinyl ether, a vinyl ester, an acrylamide or methacrylamide, an acrylic or methacrylic acid, crotonic acid, maleic acid, malonic acid, maleic anhydride, itaconic acid, $C_1$ to $C_{22}$ alkyl acrylate or methacrylate, hydroxy lower $C_1$ to $C_4$ alkyl acrylate, hydroxy lower alkyl methacrylate, vinyl propionate, esters of any of the foregoing acids or mixtures of said comonomers. Specific examples of such polymonomeric polymers include vinyl pyrrolidone/vinyl caprolactam/vinyl acetate, vinyl pyrrolidone/vinyl caprolactam/dimethyl aminopropyl methacrylamide (DMAPMA), vinyl pyrrolidone/vinyl acetate, vinyl caprolactam/dimethylamino ethyl methacrylate, vinyl pyrrolidone/dimethylamino ethyl methacrylate/dimethylamino propyl methacrylate, vinyl pyrrolidone/dimethylamino propyl methacrylate copolymers; vinyl pyrrolidone/vinyl caprolactam/$C_2$ to $C_{18}$ alkyl methacrylamide, vinyl pyrrolidone/vinyl caprolactam/methacrylic acid, vinyl pyrrolidone/methyl vinyl ether/vinyl caprolactam and vinyl pyrrolidone/vinyl caprolactam/dodecyl methacrylamide/methacrylic acid polymers and the like.

These polymers are generally obtained at between about 5 and about 65 wt. % concentration in water or in an organic solvent such as ethanol, acetone, tetrahydrofuran, toluene, acetonitrile from solution polymerization of the monomers which forms a homogeneous polymer solution containing in excess of 500 ppm vinyl lactam monomer contaminant.

The above lactam copolymers and terpolymers contain at least 30 wt. %, preferably at least 50 wt. % of the lactam moiety.

The untreated lactam polymers herein described are generally obtained from a solution polymerization process and can contain up to 10,000 ppm or more residual lactam monomer contaminant. In accordance with the present process of purification, the monomer contaminated polymer is contacted with a porous, preferably a macroreticular, absorbent which is insoluble in the polymer solvent. The absorbent is employed in an amount of between about 0.1 and about 10 wt. %, preferably between about 0.5 and about 5 wt. %, based on lactam polymer. The absorbent employed herein is an acidic polymeric resin having an acid number of from 0.5 to 20, preferably an acid number of from about 1 to about 10. Suitable absorbents include homo- and co-polymers of strongly acidic monomers containing a plurality of the sulfonic and/or weakly acidic monomers containing carboxylic functional groups such as substantially pure polystyrene sulfonic acid/divinyl benzene, e.g. AMBERLYST-15 or DOWEX-50W, ion exchange resins such as a polyacrylate having carboxylic group, e.g. IONAC-CC, DOWEX-CCR-3, and AMBERLYST-41. Of these, the prewashed aromatic sulfonic acid polymers are preferred. Optionally, when the absorbent resin contains a small amount of impurities, it can be prewashed with water or an organic solvent such as methanol, ethanol, isopropanol, tetrahydrofuran, acetone, acetonitrile, toluene etc. prior to contact with the lactam polymer.

The method of treating monomer contaminated vinyl lactam polymer comprises contacting the polymer solution, preferably containing between about 10 and about 50% lactam polymer, with the absorbent under mild conditions such as a temperature between about 25° C. and about 125° C., preferably between about 30° C. and about 65° C., for a period of from about 0.5 to about 10, preferably from about 1 to about 5 hours. The components can be contacted by mechanical mixing or the polymer solution can be passed over a fixed bed of the absorbent for the selected period of time or until the required degree of polymer purity is achieved. The purified polymer solution, containing less than 100 ppm residual vinyl pyrrolidone and, when present as a comonomer or as a homopolymer, less than 1000 ppm residual vinyl caprolactam monomer, is then subjected to filtration to remove the contaminant carrying absorbent particles. During the lactam absorption process it is found that other color and odor forming components, such as those derived from amide or amine comonomers, are also removed to provide a completely colorless, odorless product.

The absorbent material of this invention is easily regenerated by treatment with an inorganic base, such as for example NaOH, followed by acidification to restore its acid value. Thus, a continuous purification process is readily feasible.

Having generally described the invention, reference is now had to the following examples which illustrate preferred embodiments but which are not to be construed as limiting to the scope of the invention as defined by the accompanying claims.

EXAMPLE 1

Into a 16 oz. glass jar equipped with a mechanical stirrer was introduced 195.2 g of VP/VCL/DMAEMA* terpolymer (45% solids in ethanol) containing 400 ppm residual VP and 5,000 ppm residual VCL. The terpolymer was diluted to a concentration of 30% solids with 97.6 g of ethanol. To this solution was added 9.74 g of dry poly(styrene sulfonic acid/divinyl benzene) resin in the form of particles of 100 mesh size and the resulting mixture was heated to 50° C. and stirred for 5.5 hours after which the mixture was filtered to remove resin particles and the product analyzed for residual lactam monomer. Residual VP was reduced to less than 100 ppm and residual VCL was lowered to less than 1000 ppm to provide a completely odorless, colorless product.

* VP is N-vinyl pyrrolidone; VCL is N-vinyl caprolactam and DMAEMA is dimethyl aminoethyl methacrylate

EXAMPLE 2

Example 1 was repeated except that 400 g of the terpolymer solution (30% solids in ethanol) and 12.0 g of poly (styrene sulfonic acid/divinyl benzene of more than 99.9% purity washed in 100 cc of ethanol was substituted. This mixture was heated to 60° C. with constant stirring for 6.0 hours. The product obtained after purification was the same as that obtained in Example 1.

EXAMPLE 3

Into a water jacketed kettle equipped with an overhead mechanical stirrer was introduced 337 g of VP/VCL/DMAEMA terpolymer (40% solids in ethanol) containing 150 ppm of residual VP monomer and 7,100 ppm of residual VCL monomer. To this solution 6.71 g of substantially pure poly(styrene sulfonic acid/divinyl benzene) particles were added and the resulting mixture was heated to 55° C. under constant stirring over a period of 360 minutes with intermittent product removal for residual monomer content analysis. The results are as reported below in Table 1.

TABLE 1

| Control | VP (ppm) 150 | VCL (ppm) 7,100 |
|---|---|---|
| Time (min.) of treatment | | |
| 30 | 4.7 | 930 |
| 60 | 1.1 | 430 |
| 120 | <1 | 380 |
| 240 | <1 | 61 |

TABLE 1-continued

| Control | VP (ppm) 150 | VCL (ppm) 7,100 |
|---|---|---|
| 330 | none detectable | none detectable |
| 360 | " | " |

EXAMPLE 4

Into a 2 liter water jacketed flask equipped with an overhead mechanical stirrer was charged 350 g of VP/VCL/DMAEMA (85/10/5) terpolymer (35% solids in ethanol), containing 420 ppm residual VP monomer and greater than 1% VCL monomer. To this mixture was added 17.5 g of pure poly(styrene sulfonic acid/divinyl benzene) fine particles and the resulting mixture was heated to 60° C. The procedure of Example 3 was repeated and the results reported below in Table 2.

TABLE 2

| Control | VP (ppm) 420 | VCL (ppm) >1% |
|---|---|---|
| Time (min.) of treatment | | |
| 60 | <1 | 62 |
| 120 | <1 | 2.2 |
| 180 | <1 | <1 |
| 240 | <1 | <1 |

EXAMPLE 5

Example 2 was repeated except that an ethanol solution of VP/vinyl acetate (70/30) copolymer was substituted for the terpolymer. After only 3 hours agitation with ethanol washed AMBERLYST 15 absorbent particles, the VP content which initially was greater than 100 ppm, was significantly reduced to produce a colorless, odorless product.

EXAMPLE 6

Example 2 was repeated except that polyvinyl pyrrolidone homopolymer (MW of 40,000) was substituted for the terpolymer and the absorption process was carried out at 70° C. for 5 hours. The residual VP content which initially was greater than 100 ppm was reduced to less than 100 ppm to provide a colorless, odorless homopolymeric product.

EXAMPLE 7

Example 2 was repeated except that VP/VCL/dimethyl aminopropyl methacrylamide (50/30/20) terpolymer was substituted for VP/VCL/DMAEMA. The terpolymer of this example contained unacceptably high levels of VP and VCL as indicated by a definite tawny color and unpleasant odor. After 4 hours treatment with 4% of pure poly(styrene sulfonic acid/divinyl benzene) resin particles, the VP content was reduced well below 100 ppm and the VCL content less than 1000 ppm to provide a colorless, odorless polymeric product.

EXAMPLE 8

Example 6 is repeated except that 50,000 MW vinyl caprolactam homopolymer having a 6,000 ppm residual VCL monomer content was substituted for vinyl pyrrolidone homopolymer. After 4 hours agitation at 65° C., with the pure poly(styrene sulfonic acid/divinyl benzene) resin particles of about 75 mesh particle size, the VCL monomer content is reduced to below 700 ppm.

EXAMPLE 9

Into a water jacketed kettle equipped with a condenser and thermocouple and an overhead mechanical stirrer was introduced 377 g. of 0.1% crosslinked VP/VCL/DMAEMA terpolymer which was diluted to 30% solids with ethanol. The terpolymer contained 290 ppm VP residual monomer and 9,500 ppm residual VCL. After use in Example 5, AMBERLYST 15 absorbent particles were recovered and prewashed by soaking in ethanol overnight in a separate container. These prewashed absorbent particles (4 g.) were then introduced into the kettle containing the terpolymer of this example. The resulting mixture was heated to 55° C. and stirred for 3.5 hours. The removal of residual monomer is reported below in Table 3.

This example repeated with 1% crosslinked VP/VCL/DMAPMA provided substantially the same results.

TABLE 3

| Control | VP (ppm) 290 | VCL (ppm) 9,500 |
|---|---|---|
| Time (min.) of treatment | | |
| 30 | 23 | 1,100 |
| 60 | 6.9 | 400 |
| 120 | 1.5 | 80 |
| 200 | >1 | 10 |

EXAMPLE 10

In a continuous process, AMBERLYST 15 from one of the preceding examples was used until fully spent. The resin particles, about 3.25 g., were then recovered, added to 200 ml ethanol containing 1.0 g. of sulfuric acid and allowed to stand overnight in order to reactivate the absorbent. The reactivated AMBERLYST was then introduced into a kettle containing 100 g of partially purified VP/VCL/DMAEMA terpolymer (25% solids in ethanol) containing 61 ppm residual VP and 4,400 ppm residual VCL and the terpolymer was mixed with the reactivated resin particles at 75° C. for a period of three hours. The results of this experiment are shown below in Table 4.

TABLE 4

| Control | VP (ppm) 61 | VCL (ppm) 4,400 |
|---|---|---|
| Time (min.) of treatment | | |
| 180 | 1.2 | 190 |

The resulting terpolymer product had no discernible odor or color.

EXAMPLE 11

A N-vinyl caprolactam/N-vinyl pyrrolidone/DMAPMA polymer solution was treated at 55° C. with 3% by weight of AMBERLYST-15 which had been washed with ethanol. The resulting product was compared with untreated VP/VCL/DMAPMA polymer. The treatment not only removed residual monomer but significantly reduced color and odor as shown in Table 5.

TABLE 5

| | No Treatment | Washed Amberlyst-15 |
|---|---|---|
| Color | 46.2 | 22.2 |
| VP | 120 | 6.2 |
| VCL | 7300 | 800 |
| Odor | Strong | Weak |

What is claimed is:

1. The process for purifying a N-vinyl lactam polymer which comprises:
   (a) adjusting the concentration of a N-vinyl lactam polymer containing an excessive amount of residual vinyl lactam monomer to between about 15 and about 40 wt. % in an organic solvent to form a solution;
   (b) contacting the resulting solution with between about 0.5 and about 5 wt. % based on lactam polymer, of porous particles of a resin containing a plurality of functional sulfonic acid and/or carboxylic acid sites, said resin being substantially free of contamination and having a particle size of from about 5 to about 500 mesh;
   (c) agitating the lactam polymer in contact with the resin at a temperature of between about 25° and about 125° C. for a period of from about 0.5 to about 10 hours;
   (d) separating the resin with absorbed residual monomer from the lactam polymer solution and
   (e) recovering the resulting substantially pure N-vinyl lactam polymer as the product of the process.

2. The process of claim 1 wherein spent resin particles are washed with an inorganic acid in a solvent to reactivate the sulfonic and/or carboxylic acid sites of the resin material and recycling the reactivated resin for treatment of contaminated lactam polymer.

3. The process of claim 1 wherein said resin is contacted with lactam polymer until at least 70% of the residual monomer is removed from the lactam polymer and the resin particles are then washed with water or an organic solvent to remove contaminants and are recontacted with contaminated lactam polymer.

4. The process of claim 1 wherein said lactam polymer is the homopolymer of monomers selected from the group consisting of N-vinyl pyrrolidone and N-vinyl caprolactam.

5. The process of claim 1 wherein said lactam polymer is a copolymer of N-vinyl pyrrolidone and/or N-vinyl caprolactam containing at least 30 wt. % of the lactam moiety and the comonomer is selected from the group of a lower alkyl vinyl ether, a vinyl ester, an acrylamide, a methacrylamide, an acrylic acid, a methacrylic acid, crotonic acid, maleic acid, malonic acid, maleic anhydride, malonic anhydride, itaconic acid, a $C_1$ to $C_{22}$ alkyl acrylate, a lower alkyl methacrylate, a hydroxy lower alkyl acrylate, a hydroxy lower alkyl methacrylate, vinyl propionate, an ester of any of the foregoing acids and mixtures thereof.

6. The process of claim 5 wherein said lactam copolymer contains at least 50 wt. % lactam units.

7. The process of claim 5 wherein said lactam polymer is the terpolymer of N-vinyl pyrrolidone/N-vinyl caprolactam/dimethylamino lower alkyl methacrylate.

8. The process of claim 5 wherein said lactam polymer is the terpolymer of N-vinyl pyrrolidone/N-vinyl caprolactam/dimethylamino lower alkyl methacrylamide.

9. The process of claim 7 or 8 wherein the N-vinyl lactam portion is at least 60 wt. % of the terpolymer.

10. The process of claim 1 wherein said lactam polymer is the copolymer of N-vinyl pyrrolidone and vinyl acetate.

11. The process of claim 1 wherein said resin is the copolymer of poly(styrene sulfonic acid) and divinyl benzene.

12. The process of claim 1 wherein said resin has an acid number of between about 1 and about 10.

13. The process of claim 12 wherein said resin has an acid number between about 2 and about 6.

14. The process of claim 1 wherein said purification of said N-vinyl lactam polymer is the removal of color.

15. The process of claim 1 wherein said purification of said N-vinyl lactam polymer is the removal of odor.

16. The process of claim 1 wherein said purification of said N-vinyl lactam polymer is the reduction of residual monomer.

17. The process of claim 1 wherein the N-vinyl lactam polymer is a polymer containing at least 30 wt. % N-vinyl caprolactam units and purification of said polymer reduces the residual N-vinyl caprolactam monomer to less than 1 ppm.

* * * * *